US009202237B2

(12) United States Patent
Deitrich et al.

(10) Patent No.: US 9,202,237 B2
(45) Date of Patent: Dec. 1, 2015

(54) GENERATING A SINGLE BILLING RECORD FOR MULTIPLE SESSIONS IN A NETWORK ENVIRONMENT

(75) Inventors: Clarence L. Deitrich, Raleigh, NC (US); Walter G. Dixon, Fuquay Varina, NC (US); Mark Albert, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 162 days.

(21) Appl. No.: 11/945,346

(22) Filed: Nov. 27, 2007

(65) Prior Publication Data

US 2009/0138295 A1    May 28, 2009

(51) Int. Cl.
| | |
|---|---|
| *G07F 19/00* | (2006.01) |
| *H04M 15/00* | (2006.01) |
| *G06F 15/02* | (2006.01) |
| *G07C 1/10* | (2006.01) |
| *G06Q 30/04* | (2012.01) |
| *G06Q 20/10* | (2012.01) |
| *G06Q 10/10* | (2012.01) |
| *G06Q 40/00* | (2012.01) |
| *G06Q 40/02* | (2012.01) |

(52) U.S. Cl.
CPC ............ *G06Q 30/04* (2013.01); *G06Q 10/10* (2013.01); *G06Q 10/1091* (2013.01); *G06Q 20/102* (2013.01); *G06Q 40/00* (2013.01); *G06Q 40/02* (2013.01); *G06Q 40/10* (2013.01); *G06Q 40/105* (2013.01)

(58) Field of Classification Search
CPC ..... G06Q 30/04; G06Q 20/102; G06Q 40/10; G06Q 40/02; G06Q 40/00; G06Q 20/10
USPC ........................................................ 705/34, 32
See application file for complete search history.

(56) References Cited

U.S. PATENT DOCUMENTS

| | | | | |
|---|---|---|---|---|
| 5,201,049 | A | * | 4/1993 | Shorter ............................. 718/1 |
| 5,357,563 | A | * | 10/1994 | Hamilton et al. .......... 379/91.01 |
| 5,479,487 | A | * | 12/1995 | Hammond ................. 379/88.22 |
| 5,594,789 | A | * | 1/1997 | Seazholtz et al. .......... 379/88.02 |
| 5,706,347 | A | * | 1/1998 | Burke et al. ................... 713/153 |
| 5,721,818 | A | * | 2/1998 | Hanif et al. .................... 709/228 |
| 5,884,288 | A | * | 3/1999 | Chang et al. ..................... 705/40 |
| 5,943,656 | A | * | 8/1999 | Crooks et al. ................... 705/30 |
| 5,963,925 | A | * | 10/1999 | Kolling et al. .................. 705/40 |
| 6,029,150 | A | * | 2/2000 | Kravitz ........................... 705/39 |

(Continued)

OTHER PUBLICATIONS

3rd generation Partenership project 2 (3PGPP2 TSG-P), Wireless Packet Data Networking Prepaid Services in the cdma2000 packet data network, Nortel Network, 3GPP2-P00-P20020415_007, Apr. 2002, 10 pages.*

(Continued)

*Primary Examiner* — Matthew Gart
*Assistant Examiner* — Harshad Parikh
(74) *Attorney, Agent, or Firm* — Baker Botts L.L.P.

(57) ABSTRACT

In one embodiment, a method includes receiving a plurality of communication sessions of a transaction associated with a postpaid end user. The method includes associating the plurality of communication sessions with the transaction and extracting data from the plurality of communication sessions associated with the transaction. The method includes generating a single billing record after the transaction is completed, the single billing record comprising the extracted data from the plurality of communication sessions associated with the transaction.

18 Claims, 2 Drawing Sheets

(56) References Cited

U.S. PATENT DOCUMENTS

| | | | |
|---|---|---|---|
| 6,137,869 A * | 10/2000 | Voit et al. | 379/114.01 |
| 6,219,087 B1 * | 4/2001 | Uiterwyk et al. | 348/14.08 |
| 6,249,770 B1 * | 6/2001 | Erwin et al. | 725/35 |
| 6,360,211 B1 * | 3/2002 | Anderson et al. | 705/40 |
| 6,578,015 B1 * | 6/2003 | Haseltine et al. | 705/34 |
| 6,615,034 B1 * | 9/2003 | Alloune et al. | 455/406 |
| 6,836,797 B2 * | 12/2004 | Givoly et al. | 709/223 |
| 6,968,320 B1 * | 11/2005 | Kam et al. | 705/40 |
| 7,103,583 B1 * | 9/2006 | Baum et al. | 705/409 |
| 7,167,839 B1 * | 1/2007 | Layne | 705/40 |
| 7,173,933 B1 * | 2/2007 | O'Rourke et al. | 370/389 |
| 7,184,530 B2 * | 2/2007 | Warrier et al. | 379/114.15 |
| 7,236,950 B2 * | 6/2007 | Savage et al. | 705/34 |
| 7,272,379 B1 * | 9/2007 | Tang et al. | 455/406 |
| 7,280,645 B1 * | 10/2007 | Allen et al. | 379/114.2 |
| 7,292,538 B1 * | 11/2007 | O'Rourke et al. | 370/252 |
| 7,308,709 B1 * | 12/2007 | Brezak et al. | 726/10 |
| 7,340,436 B1 * | 3/2008 | Lilge | 705/53 |
| 7,761,609 B1 * | 7/2010 | Srinivasan et al. | 709/250 |
| 8,184,548 B1 * | 5/2012 | Croak et al. | 370/252 |
| 8,301,521 B2 * | 10/2012 | Millard et al. | 705/34 |
| 8,626,642 B2 * | 1/2014 | Foss et al. | 705/38 |
| 2002/0026394 A1 * | 2/2002 | Savage et al. | 705/34 |
| 2002/0035488 A1 * | 3/2002 | Aquila et al. | 705/4 |
| 2002/0128966 A1 * | 9/2002 | Simonen | 705/40 |
| 2002/0165783 A1 * | 11/2002 | Gonthier et al. | 705/26 |
| 2002/0184144 A1 * | 12/2002 | Byrd et al. | 705/40 |
| 2003/0101116 A1 * | 5/2003 | Rosko et al. | 705/35 |
| 2003/0139960 A1 * | 7/2003 | Nishikawa et al. | 705/8 |
| 2003/0177212 A1 * | 9/2003 | Givoly et al. | 709/223 |
| 2003/0182244 A1 * | 9/2003 | Zucchetti | 705/75 |
| 2004/0006635 A1 * | 1/2004 | Oesterreicher et al. | 709/231 |
| 2004/0044623 A1 * | 3/2004 | Wake et al. | 705/40 |
| 2004/0049576 A1 * | 3/2004 | Schweitzer et al. | 709/224 |
| 2004/0083146 A1 * | 4/2004 | Goodwin et al. | 705/34 |
| 2004/0203585 A1 * | 10/2004 | Wills et al. | 455/406 |
| 2005/0125343 A1 * | 6/2005 | Mendelovich | 705/39 |
| 2005/0138163 A1 * | 6/2005 | Schweitzer et al. | 709/223 |
| 2005/0188315 A1 * | 8/2005 | Campbell et al. | 715/742 |
| 2005/0216396 A1 * | 9/2005 | Siksa | 705/39 |
| 2006/0034303 A1 * | 2/2006 | Ikonen et al. | 370/401 |
| 2006/0063510 A1 * | 3/2006 | Wills et al. | 455/406 |
| 2006/0069577 A1 * | 3/2006 | Schmitt et al. | 705/1 |
| 2006/0089891 A1 * | 4/2006 | Nigam | 705/34 |
| 2006/0092904 A1 * | 5/2006 | Carson | 370/342 |
| 2006/0095285 A1 * | 5/2006 | Sol et al. | 705/1 |
| 2006/0116105 A1 * | 6/2006 | Frankel et al. | 455/406 |
| 2006/0168303 A1 * | 7/2006 | Oyama et al. | 709/231 |
| 2006/0173779 A1 * | 8/2006 | Bennett et al. | 705/40 |
| 2006/0208065 A1 * | 9/2006 | Mendelovich et al. | 235/380 |
| 2006/0212270 A1 * | 9/2006 | Shiu et al. | 702/188 |
| 2006/0212511 A1 * | 9/2006 | Garcia-Martin | 709/203 |
| 2006/0259433 A1 * | 11/2006 | Lahtinen et al. | 705/57 |
| 2006/0287954 A1 * | 12/2006 | DeWitt et al. | 705/40 |
| 2007/0022118 A1 * | 1/2007 | Layne | 707/9 |
| 2007/0038560 A1 * | 2/2007 | Ansley | 705/39 |
| 2007/0083470 A1 * | 4/2007 | Bonner et al. | 705/51 |
| 2007/0106609 A1 * | 5/2007 | Phillips et al. | 705/40 |
| 2007/0162364 A1 * | 7/2007 | Held | 705/34 |
| 2007/0198336 A1 * | 8/2007 | Thompson | 705/14 |
| 2007/0274490 A1 * | 11/2007 | Hu et al. | 379/201.01 |
| 2008/0243657 A1 * | 10/2008 | Voysey | 705/34 |
| 2009/0006252 A1 * | 1/2009 | Rehman et al. | 705/40 |
| 2009/0132401 A1 * | 5/2009 | Batz et al. | 705/34 |
| 2009/0132715 A1 * | 5/2009 | Puthupparambil et al. | 709/227 |
| 2009/0138295 A1 * | 5/2009 | Deitrich et al. | 705/7 |
| 2009/0327113 A1 * | 12/2009 | Lee et al. | 705/34 |
| 2010/0088125 A1 * | 4/2010 | Vaughan et al. | 705/4 |
| 2010/0241694 A1 * | 9/2010 | Jensen et al. | 709/203 |
| 2011/0270722 A1 * | 11/2011 | Cai et al. | 705/34 |
| 2012/0215694 A1 * | 8/2012 | Vilmos | 705/44 |
| 2012/0239728 A1 * | 9/2012 | Dor et al. | 709/203 |
| 2013/0339202 A1 * | 12/2013 | Zhao et al. | 705/34 |

OTHER PUBLICATIONS

Robert M. Batz et al.; *Generating a Single Advice of Charge Request for Multiple Sessions in a Network Environment*; U.S. Appl. No. 11/942,489, filed Nov. 19, 2007.

U.S. Patent and Trademark Office, Office Action for U.S. Appl. No. 11/942,489 filed Nov. 19, 2007 by Robert M. Batz, et al; *Generating a Single Advice for Charge Request for Multiple Sessions in a Network Environment*, (24 pages), Electronically mailed Mar. 31, 2009.

USPTO; Final Office Action dated Nov. 10, 2009 for U.S. Appl. No. 11/942,489, filed Nov. 19, 2007 in the name of Robert M. Batz, 33 pages.

USPTO; Office Action dated Jan. 24, 2011 for U.S. Appl. No. 11/942,489, filed Nov. 19, 2007 in the name of Robert M. Batz, 36 pages.

U.S. Patent and Trademark Office Official Action in U.S. Appl. No. 11/942,489, dated Sep. 11, 2014, 11 pages.

* cited by examiner

GENERATING A SINGLE BILLING RECORD FOR MULTIPLE SESSIONS IN A NETWORK ENVIRONMENT

TECHNICAL FIELD

The present disclosure relates generally to communication networks.

BACKGROUND

Data networking architectures have grown increasingly complex in communication systems and environments. Some network equipment may be used to bill end users for services during a transaction. When an end user communicates with a network server during the transaction, the end user generally incurs a charge associated with the use of network resources and/or the value of the content received from the network server.

As the subscriber base of end users increases and/or becomes mobile, efficient management of billing subscribers becomes even more critical. Some network equipment may generate multiple billing records or advice of charge requests for a single transaction that requires multiple sessions. Thus, the ability to efficiently manage billing for a transaction that requires multiple sessions in a network environment presents a significant challenge to system designers and network operators.

DESCRIPTION OF EXAMPLE EMBODIMENTS

Overview

In one embodiment, a method includes receiving a plurality of communication sessions of a transaction associated with a postpaid end user. The method includes associating the plurality of communication sessions with the transaction and extracting data from the plurality of communication sessions associated with the transaction. The method includes generating a single billing record after the transaction is completed, the single billing record comprising the extracted data from the plurality of communication sessions associated with the transaction.

Important technical advantages of certain embodiments include generating a single billing record for multiple sessions associated with a single transaction. As a result, billing by third parties is more convenient, efficient, and accurate because third parties do not have to correlate multiple billing records associated with multiple sessions for a single transaction. Additionally, completion of the transaction is known by client services packet gateway because client services packet gateway is monitoring the state of the plurality of sessions associated with the transaction. Therefore, client services packet gateway may collect data more effectively and accurately because client services packet gateway knows when the transaction is terminated.

Other technical advantages of certain embodiments will be readily apparent to one skilled in the art from the following figures, descriptions, and claims. Moreover, while specific advantages have been enumerated above, various embodiments may include all, some, or none of the enumerated advantages.

DESCRIPTION

Figure 1A:
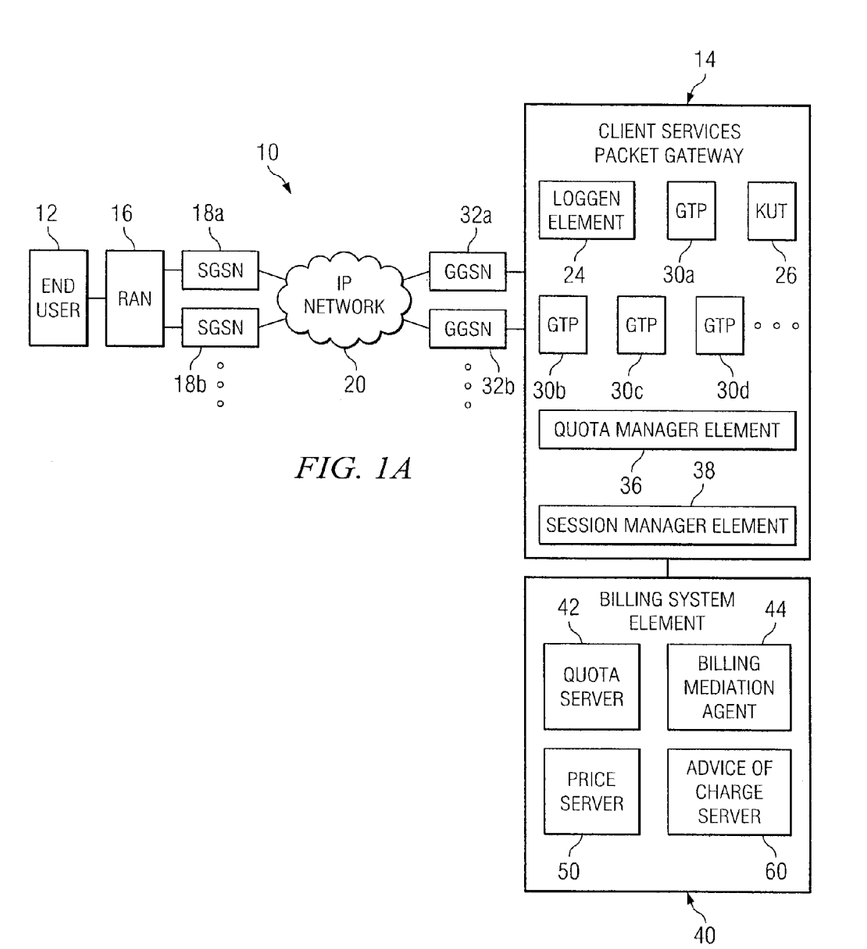
FIG. 1A illustrates an example system for generating a single billing record for multiple sessions in a network environment.

FIG. 1A is a simplified block diagram of a communication system 10 for associating an end user for generating a single billing record for multiple sessions in a network environment in a network environment. Communication system 10 includes an end user 12, a client services packet gateway 14, a radio access network (RAN) 16, multiple serving general packet radio service (GPRS) support node (SGSN) 18a and 18b, and an internet protocol (IP) network 20. Additionally, communication system 10 includes multiple gateway GPRS support nodes (GGSNs) 32a-b. Client services packet gateway 14 may include a loggen element 24, a known user table (KUT) 26, multiple GPRS tunneling protocol (GTP) communications protocol elements 30a-d that facilitate communications between client services packet gateway 14 and any billing entity within communication system 10, a quota manager element 36, and a session manager element 38. Communication system 10 may additionally include a billing system element 40 that may include a quota server 42 and a billing mediation agent (BMA) 44. Billing system element 40 may also include a price server 50 and an advice of charge server 60.

FIG. 1A may be generally configured or arranged to represent a 2.5 G communication architecture applicable to a Global System for Mobile (GSM) environment in accordance with a particular embodiment of the present disclosure. However, the 2.5G architecture is offered for purposes of example only and may alternatively be substituted with any suitable networking protocol or arrangement that provides a communicative platform for communication system 10. For example, communication system 10 may cooperate with any version of a GPRS tunneling protocol (GTP) that could benefit from a billing function being provided for any network element. This may be inclusive of first generation, 2G, and 3G architectures that provide features and services for any end user 12. Moreover, communication system 10 could be applied to any access network/protocol that allows end user 12 to create sub-connections, which specify differential treatment for packets in those connections. Furthermore, the relaying of such information into one or more client services packet gateway elements could be implemented in any such network/access technology.

According to the illustrated embodiment, system 10 provides services such as communication sessions to endpoints, such as end user 12. A communication session refers to an active communication between endpoints. Information may be communicated during a communication session. Information may include voice, data, text, audio, video, multimedia, control, signaling, and/or other information. Information may be communicated in packets, each comprising a bundle of data organized in a specific way for transmission. Each session may have a session key. The session key may include TCP or UDP port information, IP protocol information, such as TCP or UDP, virtual routing and forwarding (VRF) information, or other information. A communication session may be a data session, a control session, or any other active communication between endpoints. A data session may communicate data associated with a transaction between endpoints. A control session may control and set up the data sessions associated with a transaction between endpoints. A transaction refers to an active communication between end users that utilize communication sessions to communicate information.

In accordance with the teachings of the present disclosure, communication system 10 operates to generate a single billing record associated with an end user associated with a transaction that includes multiple communication sessions, such as Layer 4 connections. Client services packet gateway 14 may parse IP packets for each session associated with a transaction between an end user and a server or between an end user and another end user (or any other suitable destination). A transaction may be for prepaid or postpaid. A transaction may be a particular event, content, or communication flow. For example, a single transaction may include one TCP session and four UDP sessions. Client services packet gateway 14 may extract information from each session associated with the transaction and monitor the state of each session associated with the transaction. When all sessions associated with the transaction have ended, client services packet gateway 14 may generate a single billing record associated with the transaction of end user 12, such that the billing record includes the extracted information from all of the sessions. Client services packet gateway 14 may transmit the billing record to BMA 44. In a general sense, client services packet gateway 14 may cooperate with billing system element 40 in order to charge end user 12 based on a particular transaction.

For purposes of teaching and discussion, it is useful to provide some overview as to the way in which a particular embodiment operates. The following foundational information may be viewed as a basis from which the present disclosure may be properly explained. Such information is offered earnestly for purposes of explanation and discussion only and, accordingly, should not be construed in any way to limit the broad scope of the present disclosure and it potential applications.

Generally, a billing gateway provides charging services for subscriber transactions. When the subscriber communicates with a network server for the transaction, the subscriber incurs a charge associated with the use of network resources and/or the value of the retrieved content. Generally, there are two types of subscribers: a postpaid subscriber and a prepaid subscriber. A postpaid subscriber is charged after the transaction has finished. A prepaid subscriber is charged before the transaction has finished. If a prepaid subscriber does not have the necessary funds to complete the transaction, then the transaction may be terminated. Network service providers want to efficiently charge subscribers for each transaction.

Generally, if a single transaction utilizes a billing record for multiple sessions, the billing gateway generates a billing record for each session. For example, a single transaction may include one TCP session and four UDP sessions. Generally, the billing gateway generates five separate billing records associated with each session and transmits these billing records to a BMA.

Referring back to FIG. 1A, an end user 12 is a client, customer, subscriber, entity, source, or object seeking to initiate network communication in communication system 10 via IP network 20. An end user may be a postpaid end user, such that postpaid end user is charged after a transaction is complete. An end user may be a prepaid end user, such that prepaid end user is charged before a transaction is complete. End user 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used herein in this document, refers to any type of packet, numeric, voice, video, audio-visual, or script data, or any type of source or object code, or any other suitable information in any appropriate format that may be communicated from one point to another.

RAN 16 is a communications interface between end user 12 and SGSNs 18a and 18b. RAN 16 may comprise a base transceiver station and a base station controller in one embodiment. The communications interface provided by RAN 16 offers connectivity and allows data to be exchanged between end user 12 and any number of selected elements within communication system 10. RAN 16 facilitates the delivery of a request packet generated by end user 12 and the reception of information sought by end user 12. RAN 16 is only one example of a communications interface between end user 12 and SGSNs 18a and 18b. Other types of communications interfaces may be used for a desired network design based on particular needs.

SGSNs 18a and 18b and GGSNs 32a and 32b are communication nodes or elements that cooperate in order to facilitate a communication session involving end user 12. GGSNs 32a-b are communications nodes operating in a GPRS environment that may be working in conjunction with multiple SGSNs 18a and 18b to provide a communications medium in a GPRS service network. GGSNs 32a and 32b may be inclusive of a walled garden (providing a security or an access functionality to communication system 10) or any other suitable mechanism that a network operator may choose to implement in providing some connectivity for a network. GPRS represents a packet-based data bearer service for communication services that may be delivered as a network overlay for any type of suitable network configuration or platform. GPRS may support multiple internet communication protocols and may enable existing IP, point to point protocol (PPP), or any other suitable applications or platforms to operate over a given network.

IP network 20 represents a series of points or nodes of interconnected communication paths for receiving and transmitting packets of information that propagate through communication system 10. IP network 20 offers a communicative interface between end user 12 and selected GGSNs 32a-b and may be any local area network (LAN), wireless local area network (WLAN), metropolitan area network (MAN), wide area network (WAN), virtual private network (VPN), or any other appropriate architecture or system that facilitates communications in a network environment. IP network 20 may implement a user datagram protocol (UDP)/internet protocol (UDP/IP) connection and use a transmission control protocol (TCP/IP) communication language protocol in particular embodiments of the present disclosure. However, IP network 20 may alternatively implement any other suitable communication protocol for transmitting and receiving data or information within communication system 10.

Client services packet gateway 14 may facilitate some type of accounting service for communication system 10. Client services packet gateway 14 may be a wireless application protocol (WAP) gateway, a compression and/or optimization engine, a billing engine (inclusive of per-content billing), a service enforcement element, a content authorization component, a policy enforcement gateway, or any other element that is operable to modify, process, or transform data or information in a network environment. This may be inclusive of simple routers, switches, loadbalancers, gateways, bridges, or any other piece of network equipment where appropriate and based on particular needs. Client services packet gateway 14 may represent any component, device, element, or object that may benefit from having suitable signaling information provided to it such that appropriate billing may be achieved.

Client services packet gateway 14 supports advanced billing capabilities for postpaid and prepaid services. Client services packet gateway may inspect protocols at Layers 3-7. In addition to charging for volume and time usage, client services packet gateway 14 may report application protocol information, such as WAP 1.x, HTTP URLs, other headers, RTSP stream information, session initiation protocol (SIP), mail protocol headers, etcetera. For a prepaid or postpaid service, client services packet gateway 14 may extract billing information and transmit a billing record to BMA. For a prepaid or postpaid service, client services packet gateway 14 may interface with Quota Server via GTP protocol to acquire quota for prepaid billing services. Additionally, client services packet gateway 14 may extract billing information from a communication session and transmit an advice of charge request to advice of charge server.

A billing record may be a record of information related to a transaction or communication session associated with end user 12. A billing record logs a summary of what occurred during the transaction or communication session. The billing record may log several information related to the transaction or communication session, such as the total number of bytes, the total time elapsed, and if the content was received successfully. After end user 12 has received the content associated with the transaction or communication session, a billing record is generated. A billing record may also be generated when the transaction or communication session is complete.

An advice of charge request may be a message sent by client services packet gateway 14 to enable a quota server to determine the billing for a transaction. Quota server may determine if end user 12 has sufficient funds in account to continue with the transaction or communication session. An advice of charge request may be a message sent to end user to notify end user the cost of the transaction or communication session, such that end user may choose to continue or cancel the transaction or communication session. An advice of charge request may be a message sent to a filtering server to determine if the content of the transaction or communication session is suitable for end user. An advice of charge request may be sent to any suitable element operable to process advice of charge requests in communication system 10, such as advice of charge server 60. An advice of charge request may be a message sent to quota server or filtering server to control the billing for a transaction or communication session. The advice of charge request may occur before the transaction is complete. For example, end user 12 may request a transaction, such as downloading a movie. The advice of charge request may occur before end user receives content associated with the transaction.

In operation of an example embodiment, client services packet gateway 14 may generate a single billing record associated with a transaction that includes multiple communication sessions, such as Layer 4 connections. Client services packet gateway 14 may parse IP packets for each session associated with a transaction between an end user and a server or between an end user and another end user (or any other suitable destination). For example, a single transaction may include several sessions with different protocols and data types, such as an RTSP session, a SIP session, TCP session, UDP audio session, UDP audio control session, UDP video session, UDP video control session, and any other session type. Client services packet gateway may extract data from each session associated with the transaction and monitor the state of each session associated with the transaction. For example, extracted data may include several different types of data, such as total bytes transferred, transaction name, the underlying protocol, and any relevant data used for billing an end user. When all sessions associated with the transaction have ended, client services packet gateway may generate a single billing record associated with the transaction of the end user, such that the billing record includes the extracted information from all of the sessions associated with the single transaction. Client services packet gateway 14 may know that the transaction has ended because all associated communication sessions have terminated.

Client services packet gateway 14 may utilize the identity of the client or other data, such as server or port data, to associate sessions with a particular transaction. Client services packet gateway 14 may also use the identity of the client to provide services based on a source profile. In a particular embodiment of the present disclosure, client services packet gateway 14 provides client-aware services by operating at networking layers two and three. Accordingly, the information available at networking layers two and three provides a basis for the identification of an end user or a client. Client services packet gateway 14 may use an IP address or any other suitable parameter to uniquely identify a client or an end user in offering a service, enhanced capability, or feature to an end user. Client services packet gateway 14 may include any suitable hardware, software, components, or elements that identify a unique identifier in order to provide some networking feature or capability to an end user.

Client services packet gateway 14 may also be a client-aware device that provides or offers some service or feature to end user 12. Such services may be based on an effective mapping between a source IP address or a destination IP address of a given address packet and a user profile or information associated with end user 12. Client services packet gateway 14 may include a RADIUS component that may receive RADIUS updates and parse the updates. In addition, client services packet gateway 14 may execute some action based on the RADIUS updates it receives. Client services packet gateway 14 may be provided with accounting, authorization and authentication (AAA) capabilities where appropriate. Alternatively, these capabilities may be provided external to client services packet gateway 14, for example, in an AAA server.

There are other reasons why a device or a component may seek to identify the source (end user 12) associated with a communication session or data flow. For example, some devices may wish to identify end user 12 for authorization purposes. In another example, a device may wish to maintain user profiles for billing or accounting records (for example, in conjunction with per-user accounting) or to provide for content billing information. Alternatively, a device or a component may use the identification of end user 12 to provide for any other type of suitable client-aware service, tool, or feature according to the particular needs of network operators. Additional services may be related to areas such as routing, permissions or access-granting mechanisms, priority, quality of service (QoS), firewalling, content filtering, or any other suitable parameters or policies where user-aware characteristics serve as a basis for a network service implementation.

In an example scenario, end user 12 may have a communication session established with SGSN 18a where a certain amount of money from an account of end user 12 is translated into a download of a given number of bytes. When end user 12 moves to SGSN 18b, end user 12 may be permitted to download a different number of designated bytes for the same amount of money or billing rate. The SGSN change may be detected by GGSN 32a or 32b whereby the selected GGSN communicates an accounting update to client services packet gateway 14. Client services packet gateway 14 may then return all downloaded quota for end user 12 and notify billing system element 40 of the change in SGSN. Client services packet gateway 14 may also communicate an acknowledgement to the selected GGSN for the message provided thereto. Client services packet gateway 14 may then download the appropriate quota information for end user 12 again. This information may be retrieved from quota server 42 or alternatively from any other suitable database or storage element provided within billing system element 40 or provided external thereto. Billing system element 40 may be aware of the location change and send quota information to client services packet gateway 14 based on new financial parameters or new tariff characteristics that apply to the new location or the change in network parameters.

Client services packet gateway 14 may be inserted into a data flow that may view, extract, identify, access, or otherwise monitor information included within the data flow. Client services packet gateway 14 may handle the enforcement of access, quota distribution, and accounting that is provided by the information retrieved from elements included within billing system element 40. Client services packet gateway 14 may generally deduct quota after it has been properly allocated and, subsequently, retrieve additional quota when that quota allocation has been consumed. In a general sense, client services packet gateway 14 may be responsible for quota enforcement for end user 12.

Loggen element 24 is a storage element operable to build billing records and communicate the billing records to BMA 44 based on information provided by KUT 26. Even in cases where the information returned by KUT 26 reflects a null (e.g., no active BMA), this may be communicated to GTP element 30a, which may use the value to determine the destination and queue(s) to use or to invoke for a corresponding billing record. Loggen element 24 may also operate to store data for later use and execute all formatting for billing records to be communicated to BMA 44. Loggen element 24 may be implemented using hardware, software, or any other suitable element or object operable to store information and to generate a billing record to be communicated to BMA 44. Loggen element 24 may communicate with BMA 44 in order to log quota usage data associated with end user 12. Loggen element 24 may generate logging records or billing records and additionally send messages to billing system element 40 associated with a change in SGSN.

KUT 26 is a data storage element that manages one or more correlations between the ID of end user 12 and a corresponding IP address. KUT 26 may also store information relating to BMA 44, previously designated to end user 12, and BMA 44 may be invoked when additional information associated with end user 12 is communicated to client services packet gateway 14. KUT 26 may be consulted as additional billing records are created in order to determine that BMA 44 should receive selected billing records. KUT 26 may also include an application program interface (API) that may be implemented in order to obtain user ID information for an IP address from a data flow.

Client services packet gateway 14 and billing system element 40 may implement any suitable communications protocol in order to exchange information. In an example embodiment, GTP elements 30a-d may be used as a communications protocol or platform for such communications. Alternatively, client services packet gateway 14 and billing system element 40 (or BMA 44) may implement any communications protocol or tunneling communication link in order to provide for a suitable data exchange. GTP elements 30a-d may be included in client services packet gateway 14 or provided external thereto and be GTP or non-GTP based where appropriate. In one embodiment, GTP elements 30a-d are software communication protocols that describe the acknowledgement (or ACKing) and handshaking operations that may allow recognition of active, operational, and disabled states associated with BMA 44. In addition, GTP elements 30a-d may facilitate the formatting, header information, sequencing, and other communication parameters in order to effectively deliver data or information between client services packet gateway 14 and BMA 44.

A billing record may then be created within client services packet gateway 14 and sent to BMA 44. A look-up operation may then be performed in order to correlate the IP address of end user 12 in KUT 26 to the user ID that may be included in that billing record. With this information provided, BMA 44 may now be assigned for this end user (if end user 12 is a new user). If this information or data flow is associated with an existing end user 12, it may be determined that BMA 44 was previously used by end user 12.

Quota manager element 36 is an element that manages quota information for services subscribed to by end user 12. Quota manager element 36 also provides an interface between GGSNs 32a and 32b and billing system element 40. Quota manager element 36 may also communicate with billing system element 40 in order to exchange information associated with charging for end user 12. Quota manager element 36 may also receive RADIUS updates from GGSN 32a or 32b that reflect the current status associated with end user 12.

Session manager element 38 is an element that may associate multiple communication sessions with a particular transaction, monitor the state of the communication sessions, extract data from each communication session associated with a particular transaction, and generate a single billing record that includes the extracted data from the multiple communication sessions associated with a particular transaction. Session manager element 38 may associate the multiple communication sessions with a particular transaction by using information such as identity of end user, identity of transaction, port numbers, etcetera. Session manager element 38 may monitor the state of the communication sessions. When a new communication session associated with the transaction is initiated, session manager may monitor the state of that particular communication session. When a communication session associated with the transaction is terminated, session manager can stop monitoring that particular communication session. Session manager element 38 may extract data from the communication sessions associated with the transaction. The extracted data may include data from data sessions and/or control sessions. The extracted data may originate from different underlying protocols and include different types of data. For example the extracted data may include total bytes transferred, end user information, transaction title, type of protocol of the underlying session, etcetera. Session manager element 38 may generate a single billing record for a transaction having multiple communication sessions, such that the single billing record includes all extracted data from the multiple communication sessions. The operations and processes associated with session manager element 38 are described below with reference to FIG. 2.

It is critical to note that client services packet gateway 14 and session manager element 38 may include any suitable elements, hardware, software, objects, or components capable of effectuating their operations or additional operations where appropriate. Additionally, any one or more of the elements included in client services packet gateway 14 and session manager element 38 may be provided in an external structure or combined into a single module or device where appropriate. Moreover, any of the functions provided by client services packet gateway and session manager element may be offered in a single unit or single functionalities may be arbitrarily swapped between client services packet gateway 14 and session manager element 38. The embodiment offered in FIG. 1A has been provided for purposes of example only. The arrangement of elements (and their associated operation(s)) may be reconfigured significantly in any other appropriate manner in accordance with the teachings of the present disclosure.

Billing system element 40 is an object that manages the billing and access policies associated with a given end user 12. In one embodiment, billing system element 40 includes quota server 42, BMA 44, price server 50, and advice of charge server 60. Client services packet gateway 14 may communicate with billing system element 40 in order to retrieve information or learn of billing policies for end user 12.

Quota server 42 is an object that interacts with client services packet gateway 14 to communicate billing information used to control end user's network traffic. Quota server 42 may provide client services packet gateway 14 with each end user's billing plan (services), quota grant, thresholds for obtaining additional quota, and certain specific control messages, such as handling out-of-quota conditions.

Billing mediation Agent (BMA) 44 is an object that interacts with client services packet gateway 14, such as receiving billing records from client services packet gateway 14. BMA may receive billing records in both the prepaid and postpaid billing models. BMA 44 is primarily used in the postpaid billing model. BMA 44 may process billing records into a form useful for the service provider.

Advice of charge server 60 is an object that interacts with client services packet gateway 14 in both prepaid and postpaid billing models. Advice of charge server 60 may bill an end user in real time per transaction. Client services packet gateway may transmit an advice of charge request to advice of charge server 60. Advice of charge server 60 may process a particular advice of charge request and transmit the amount of funds that it will charge end user 12 for the transaction. In a prepaid billing model, client services packet gateway 16 may deduct this amount from the end user's quota.

Figure 1B:
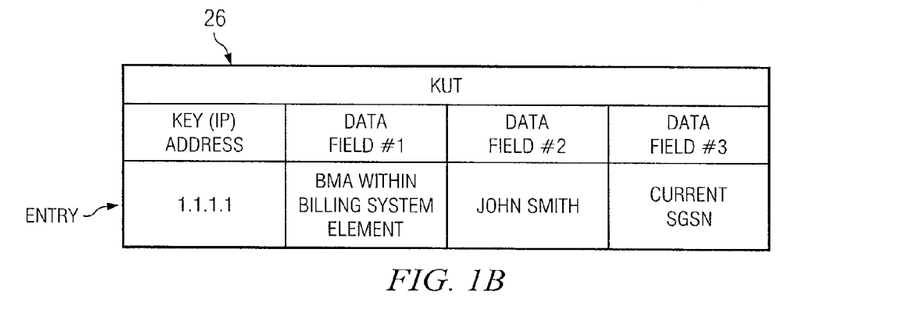
FIG. 1B illustrates a simplified block diagram of a known user table (KUT) included within the communication system.

FIG. 1B is a simplified block diagram of KUT 26 included within communication system 10 in accordance with one embodiment of the present disclosure. KUT 26 may operate to manage or correlate user ID information with IP address data from a given communication or data flow. A number of entries may be included within KUT 26 that execute this correlation. For example, an entry may be provided as key address '1.1.1.1' with a data field in a first segment that defines BMA 44 (data field #1) and a data field in a second segment that identifies a user ID for that IP address as some person or entity (data field #2). This is illustrated by the 'John Smith' entry in FIG. 2.

KUT 26 may also identify or store current SGSN information (data field #3) for end user 12 in a third segment. KUT 26 may receive RADIUS updates and maintain an end user's IP address and new SGSN that is being used. KUT 26 may be accessed in order to indicate that end user 12 has an IP address of 1.1.1.1. Such an address may correspond to 'John Smith' and an identifier of SGSN #1 (e.g. its IP address) or that 'John Smith' is now engaging SGSN #2 (reflected by its identifier, e.g. its IP address). KUT 26 has the capability of recognizing old and new SGSNs and may further add a capability to recognize changes therewith.

In operation, KUT 26 may return a given BMA 44 to use as the destination for all billing records for a particular session, data flow, or end user 12 in accordance with one or more of the following example guidelines. If an element with an already known user ID exists in KUT 26 and corresponds to any requested IP address, the identification (IP address) of the selected BMA 44 may be forwarded from KUT 26 to the caller entity. Where requested elements with user IDs exist, the selected BMA 44 for a first IP request may be returned.

If neither IP address has a corresponding element in KUT 26, KUT 26 may notify loggen element 24 that no user ID is present in the table. When loggen element 24 determines that no user ID information will be obtained, it may communicate with KUT 26 and deliver source and destination IP addresses in order to assign BMA 44. KUT 26 may also operate to accurately recall the IP address associated with an identification correlating to end user 12. In an example scenario, client services packet gateway 14 may not know the identity of end user 12 and therefore an IP source address or some other user-identifying data is needed. The IP address may be dynamically assigned when an associated device is activated, e.g., a cellular telephone is turned on. The IP address may be assigned by any suitable element such as GGSN 32a or 32b, for example. Alternatively, an IP source address may be assigned or designated in any other suitable manner. KUT 26 may now be implemented to retrieve the user ID name associated with the IP address correlating to end user 12. This information may be positioned in a billing record that may be used to create a bill for a given end user 12. This may also be used (for example) to track information such as how many bytes were uploaded by end user 12 (byte counts) or how many URL addresses were accessed (or which URL addresses were accessed) by a given end user 12.

KUT 26 is thus provided with the capability of mapping the source IP address (or any other end user 12 parameter) to a user ID. The user ID may be obtained from an external database where appropriate or any other suitable location. Alternatively, the user ID may be extracted from a RADIUS flow, a terminal access controller access control system (TACACS) communications flow, a diameter communications flow, or any other suitable communications protocol flow, communication session, or data exchange. The database may be populated at any suitable time and updated using any suitable mechanism, such as via the sniffing of RADIUS or TACACS flows.

Figure 2:
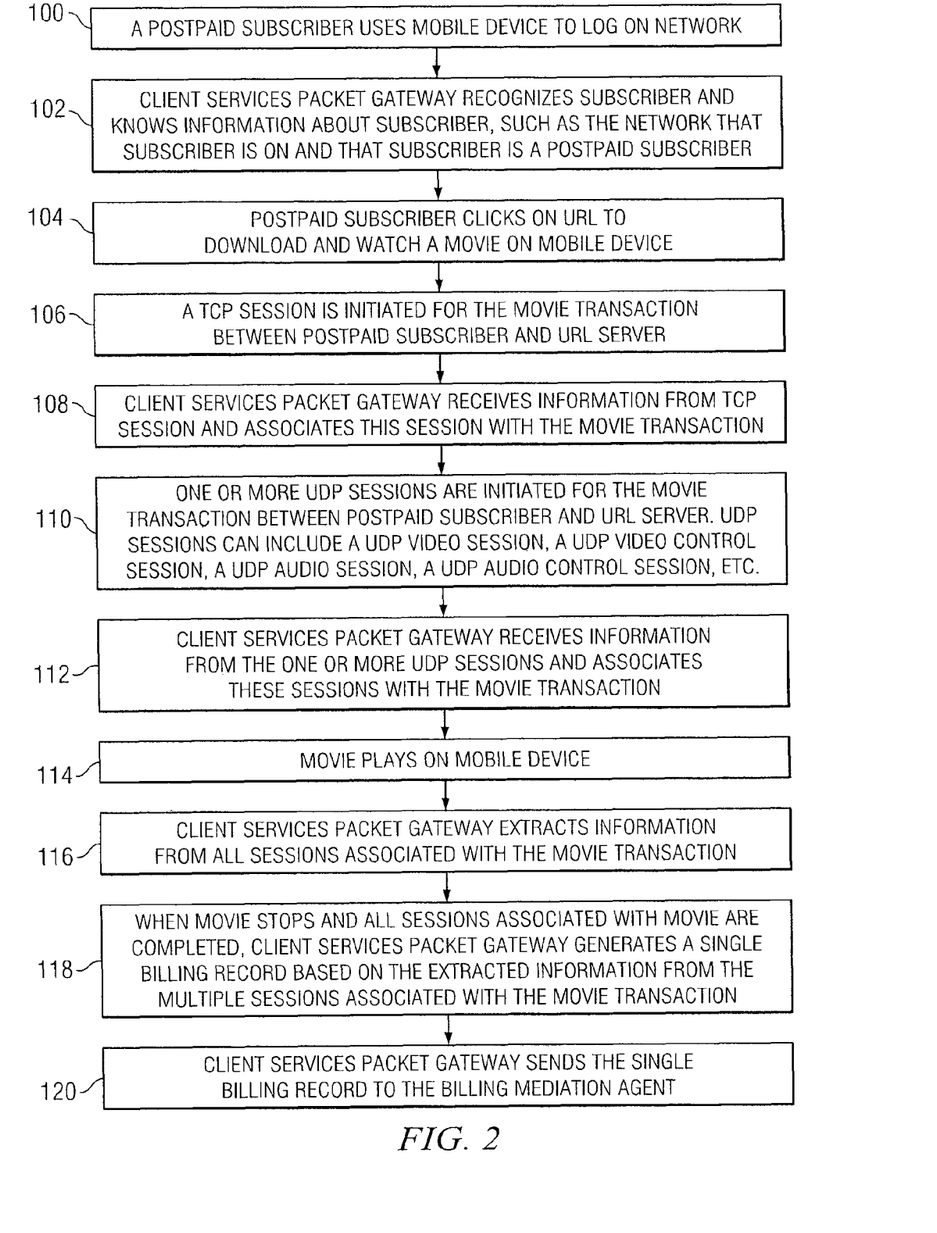
FIG. 2 illustrates an example method for generating a single billing record for multiple sessions in a network environment.

FIG. 2 is a simplified flowchart illustrating an example method for generating a single billing record for multiple sessions in a network environment. The flowchart may begin at step 100 where end user (i.e., subscriber) uses mobile device to log on network. At step 102, client services packet gateway recognizes subscriber and knows information related to subscriber, such as the network that the subscriber is on and that subscriber is a prepaid or postpaid subscriber.

At step 104, the subscriber clicks on a URL via subscriber's mobile device to download and watch a movie on subscriber's mobile device. At step 106, a TCP session is initiated for the movie transaction between the subscriber and URL server. At step 108, client services packet gateway receives data from TCP session and associates this session with the movie transaction. Client services packet gateway monitors the state of the TCP session and begins extracting data from TCP session.

At step 110, one or more UDP sessions are initiated for the movie transaction between the subscriber and URL server. UDP sessions may include a UDP video session, a UDP video control session, a UDP audio session, a UDP audio control session, etcetera. At step 112, client services packet gateway receives information from the one or more UDP sessions and associates these sessions with the movie transaction. Client services packet gateway monitors the state of the UDP sessions and begins extracting data from each UDP session.

At step 114, the movie plays on subscriber's mobile device. At step 116, client services packet gateway continues to extract data from all communication sessions associated with the movie transaction.

At step 118, subscriber may prematurely end the movie or the movie may end naturally. When movie stops and all sessions associated with the movie are terminated, client services packet gateway generates a single billing record that includes the extracted data from the multiple sessions associated with the movie transaction. At step 120, client services packet gateway sends the single billing record to the billing mediation agent.

Some of the steps illustrated in FIG. 2 may be changed or deleted where appropriate and additional steps may also be added to the flowcharts. These changes may be based on specific communication architectures or particular interfacing arrangements and configurations of associated elements and do not depart from the scope or the teachings of the present disclosure. The interactions and operations of the elements within billing system element 40 and client services packet gateway 14, as disclosed in FIG. 2, have provided merely one example for their potential applications. Numerous other applications may be equally beneficial and selected based on particular networking needs.

Although the present disclosure has been described in detail with reference to particular embodiments, communication system 10 may be extended to any scenario in which end user 12 is provided with pricing decisions in the context of a wired or a wireless connection or coupling. This may also be extended to any other network architectures and include communications with some type of access server (e.g. a network access server (NAS), foreign agents, etc.). End user 12 may use a dedicated connection of some form or use forms of multiple access protocols where appropriate. Access may be associated with a PPP architecture or alternatively with layer three protocols over a layer two in accordance with particular needs. Moreover, significant flexibility is provided by communication system 10 in that any suitable one or more components may be replaced with other components that facilitate their operations. For example, RAN 16 and SGSNs 18a and 18b may be replaced by an access network or by a packet data serving node (PDSN). Additionally, GGSNs 32a and 32b may be replaced by a home agent or a NAS where appropriate.

Additionally, although communication system 10 has been described with reference to a number of elements included within client services packet gateway 14 and billing system element 40, these elements may be rearranged or positioned anywhere within communication system 10. In addition, these elements may be provided as separate external components to communication system 10 where appropriate. The present disclosure contemplates great flexibility in the arrangement of these elements as well as their internal components. For example, in an alternative embodiment client services packet gateway 14 may include billing system element 40 or BMA 44 or these elements may be provided in a single module. Moreover, although FIGS. 1 and 2 illustrate an arrangement of selected elements, such as client services packet gateway 14 inclusive of quota manager element 36, loggen element 24, or GTP elements 30a-d, numerous other components may be used in combination with these elements or substituted for these elements without departing from the teachings of the present disclosure. Additionally, client services packet gateway 14 may be positioned in any suitable point of a data flow such that it may extract information used for generating a billing record.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. An apparatus, comprising:
a client services packet gateway operable to communicate with a postpaid end user in order to manage a transaction comprising an item of content, the item of content communicated through a plurality of communication sessions, at least two of the plurality of communication sessions comprising charging data, the plurality of communication sessions comprising different communication protocols; and
a session manager element operable to:
receive the plurality of communication sessions associated with the transaction;
extract charging data from a first communication session of the plurality of communication sessions associated with the transaction;
extract additional charging data from one or more remaining communication sessions of the plurality of communication sessions associated with the transaction;
determine that the one or more remaining communication sessions are associated with the first communication session based on the extracted charging data and the extracted additional charging data; and
generate a single billing record for the plurality of communication sessions after the transaction is completed, the single billing record comprising the extracted charging data from the first communication session and the extracted additional charging data from the one or more remaining communication sessions of the plurality of communication sessions associated with the transaction.

2. The apparatus of claim 1, wherein the session manager element is further operable to monitor a status of the plurality of communication sessions.

3. The apparatus of claim 1, wherein the client services packet gateway is further operable to transmit the single billing record to a billing mediation agent.

4. The apparatus of claim 1, wherein the transaction is completed after the plurality of communication sessions are terminated.

5. The apparatus of claim 1, wherein the plurality of communication sessions include a TCP communication session and a UDP communication session.

6. The apparatus of claim 1, wherein the first communication session is a UDP audio control session.

7. The apparatus of claim 1, wherein the extracted charging data and the extracted additional charging data in the single billing record comprises the total number of bytes transferred by the plurality of communication sessions associated with the transaction.

8. The apparatus of claim 1, wherein the client services packet gateway is operable to provide one or more services being selected from a group of services consisting of:
   a) accounting;
   b) firewalling;
   c) filtering;
   d) wireless application protocol transformations;
   e) compression;
   f) optimization;
   g) billing;
   h) content authorization;
   i) intrusion detection; and
   j) intrusion prevention.

9. A method, comprising:
   receiving a request, from a postpaid end user, associated with a transaction for an item of content, the item of content communicated through a plurality of communication sessions, at least two of the plurality of communication sessions comprising charging data;
   receiving the plurality of communication sessions associated with the transaction, the plurality of communication sessions comprising different communication protocols;
      extracting charging data from a first communication session of the plurality of communication sessions associated with the transaction;
   extracting additional charging data from one or more remaining communication sessions of the plurality of communication sessions associated with the transaction;
   determining that the one or more remaining communication sessions are associated with the first communication session based on the extracted charging data and the extracted additional charging data; and
   generating a single billing record for the plurality of communication sessions after the transaction is completed, the single billing record comprising the extracted charging data from the first communication session and the extracted additional charging data from the one or more remaining communication sessions of the plurality of communication sessions associated with the transaction.

10. The method of claim 9, further comprising monitoring a status of the plurality of communication sessions.

11. The method of claim 9, further comprising transmitting the single billing record to a billing mediation agent.

12. The method of claim 9, wherein the transaction is completed after the plurality of communication sessions are terminated.

13. The method of claim 9, wherein the plurality of communication sessions include a TCP communication session and a UDP communication session.

14. The method of claim 9, wherein the first communication session is a UDP audio control session.

15. The method of claim 9, wherein the extracted charging data and the extracted additional charging data in the single billing record comprises the total number of bytes transferred by the plurality of communication sessions associated with the transaction.

16. The method of claim 9, further comprising the plurality of communication sessions providing one or more services being selected from a group of services consisting of:
   a) accounting;
   b) firewalling;
   c) filtering;
   d) wireless application protocol transformations;
   e) compression;
   optimization;
   g) billing;
   h) content authorization;
   i) intrusion detection; and
   j) intrusion prevention.

17. An apparatus, comprising:
   means for receiving a request, from a postpaid end user, associated with a transaction for an item of content, the item of content communicated through a plurality of communication sessions, at least two of the plurality of communication sessions comprising charging data;
   means for receiving the plurality of communication sessions associated with the transaction, the plurality of communication sessions comprising different communication protocols;
   means for extracting charging data from a first communication session of the plurality of communication sessions associated with the transaction;
   means for extracting additional charging data from one or more remaining communication sessions of the plurality of communication sessions associated with the transaction;
   means for determining that the one or more remaining communication sessions are associated with the first communication session based on the extracted charging data and the extracted additional charging data; and
   means for generating a single billing record for the plurality of communication sessions after the transaction is completed, the single billing record comprising the extracted charging data from the first communication session and the extracted additional charging data from the one or more remaining communication sessions of the plurality of communication sessions associated with the transaction.

18. The apparatus of claim 17, further comprising monitoring a status of the plurality of communication sessions.

* * * * *